Nov. 12, 1940.　　F. W. PULLEN　　2,221,107
PAN DUMP MECHANISM
Filed Jan. 3, 1939　　2 Sheets-Sheet 1
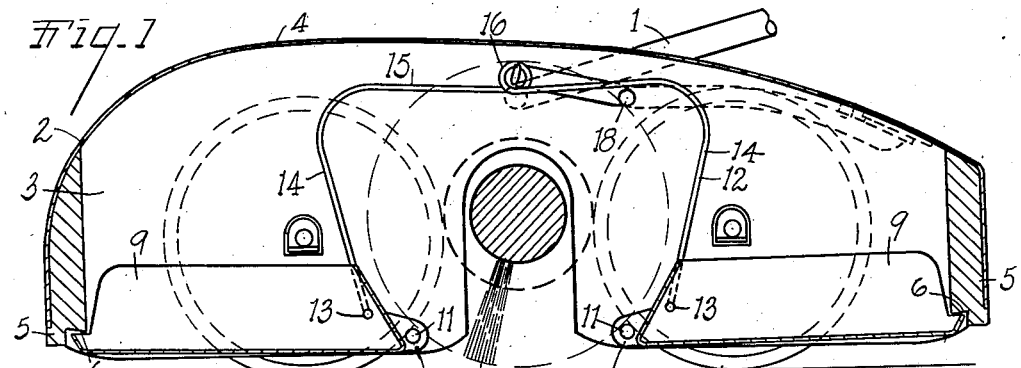
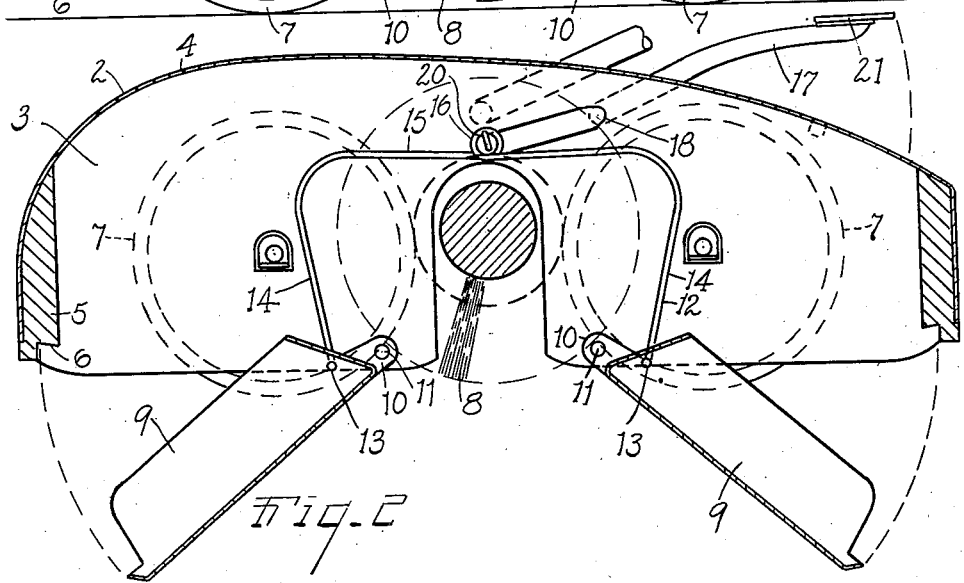
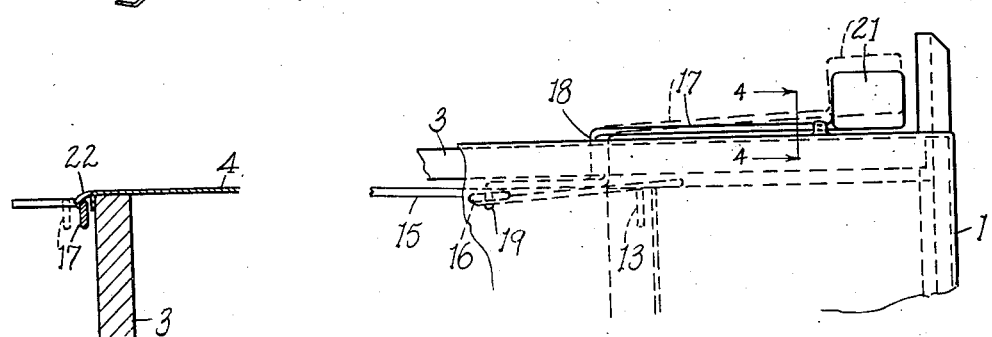
INVENTOR
Fred W. Pullen
BY
ATTORNEYS.

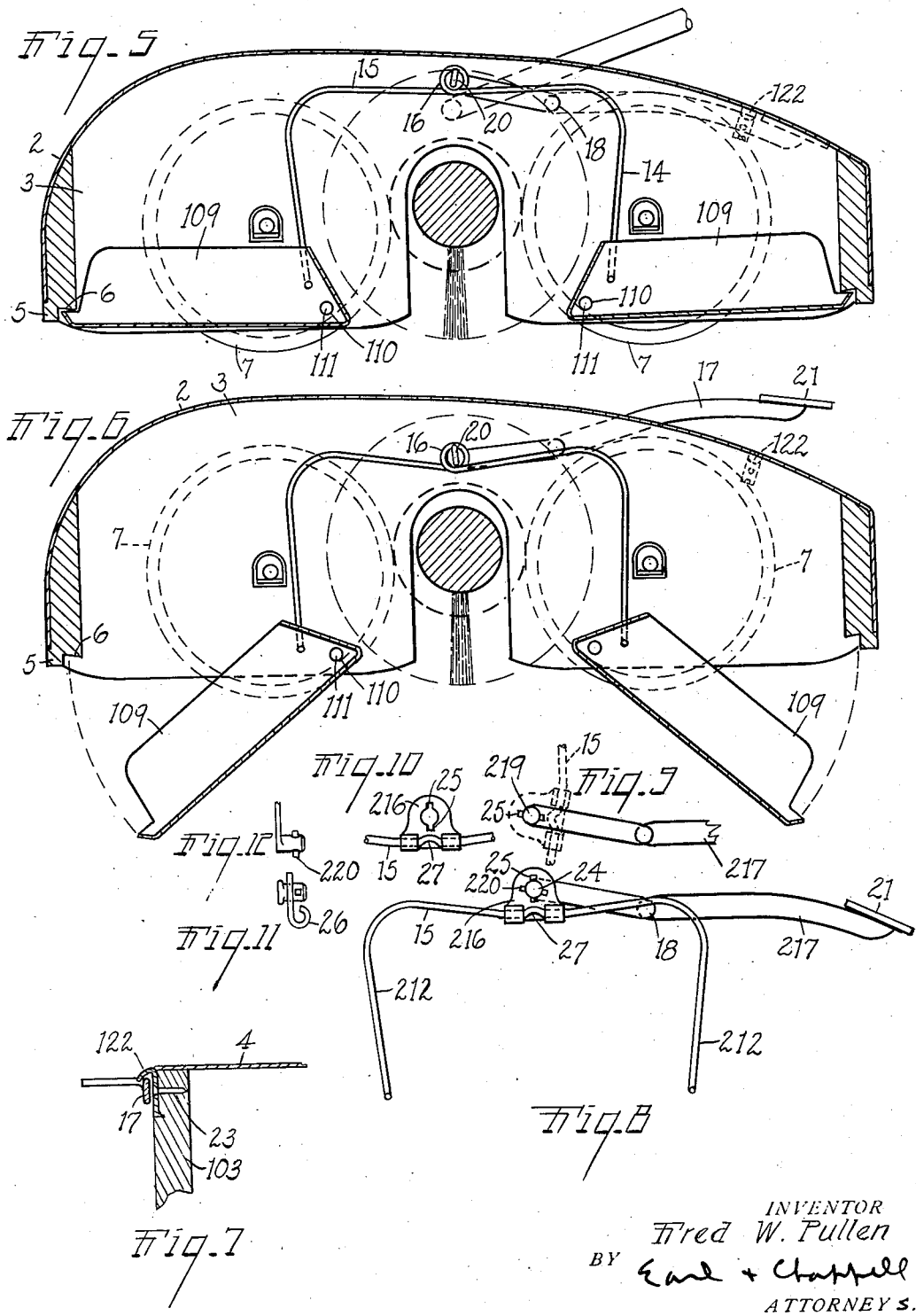

Patented Nov. 12, 1940

2,221,107

UNITED STATES PATENT OFFICE 2,221,107

PAN DUMP MECHANISM

Fred W. Pullen, Grand Rapids, Mich., assignor to Bissell Carpet Sweeper Co., Grand Rapids, Mich.

Application January 3, 1939, Serial No. 249,012

7 Claims. (Cl. 15—41)

This invention relates to improvements in pan dump mechanisms.

This invention relates to carpet sweepers and particularly to the dust pan holding and dumping mechanism. It has for its objects:

First, to provide a simple and effective dust pan dumping mechanism for carpet sweepers which mechanism may be inexpensively produced and which is effective in operation.

Second, to provide such a mechanism in which the dust pans are held resiliently in closed position to eliminate rattling thereof during operation of the sweeper.

Third, to provide such a mechanism in which the pans may be dumped merely by releasing the mechanism without the necessity for exerting a force on the pans for this purpose and without the necessity for placing the fingers of the operator in position to be pinched.

Fourth, to provide such a mechanism which is particularly adapted for use in all metal carpet sweepers or in carpet sweepers in which the wheels and other parts are enclosed by a casing.

Other objects and advantages pertaining to details and economies of construction and operation will appear from the description to follow. The invention is defined in the claims. Preferred objects of my invention are illustrated in the accompanying drawings, in which:

Fig. 1 is a sectional view through a carpet sweeper embodying my invention showing the dust pans in closed position.

Fig. 2 is a corresponding view showing the pans in open position.

Fig. 3 is a top plan view of a carpet sweeper embodying my invention showing the dust pan dumping lever in the pan closing position, showing in dotted lines the position to which the lever is moved to release it.

Fig. 4 is a detail sectional view taken on line 4—4 of Fig. 3.

Fig. 5 is a sectional view of a slightly modified form of sweeper embodying my invention, showing the pans in closed position.

Fig. 6 is a view of the sweeper of Fig. 5 showing the pans in open position.

Fig. 7 is a detail sectional view showing the type of catch employed in the sweeper of Figs. 5 and 6.

Fig. 8 is a fragmentary view showing a modification of the connection between the dump lever and the pan actuating spring.

Fig. 9 is a view showing the manipulations involved in connecting the end of the dump lever shown in Fig. 8 to the spring.

Fig. 10 is a view showing the connecting member of Figs. 8 and 9.

Fig. 11 is a detail sectional view of the connecting member showing the connection between the dump lever and said member.

Fig. 12 is a detail view of the end of the dump lever of Fig. 8.

Referring to the carpet sweeper shown in Figs. 1–4, I there show a carpet sweeper 1 having a case 2 made up of a pair of ends 3, one only of which is shown, and a sheet metal top 4. The sides of the case are made up of wood pieces 5 which extend lengthwise of the case and are notched at the bottom as at 6 to provide stops against which the pans of the carpet sweeper close. Suitable wheels 7 and a conventional brush 8 are provided. The dust pans 9 extend lengthwise of the case and are spaced from one another, one pan extending along each side of the bottom of the case to close the same.

In the carpet sweeper shown in Figs. 1–4, there are provided adjacent the ends of the inner edges of the pans ears 10 which are apertured to receive pivots 11 on the end of the case. The pans, being pivoted on these pivots, may be swung from the closed position shown in Fig. 1 to the open position shown in Fig. 2. For actuating the pans for dumping them and for holding them resiliently in closed position, I provide a pan closing member 12 which has its ends 13 pivoted in the ends of the pans at points spaced from the pivots 11 outwardly toward the edges of the case. Substantially vertical arms 14 extend upwardly from the pans and a connecting portion 15 disposed substantially horizontally connects these arms.

The member 12 is a spring member and because of the particular shape thereof, there is sufficient resiliency to permit the spring to flex as the pans move from open to closed position. Centrally of the horizontal portion of the spring member 12, I form a loop 16. On the end of the case adjacent the spring member 12, I provide a dump lever 17 pivoted between its ends as at 18 by an offset portion which extends through the end 3 of the carpet sweeper as shown in dotted lines in Fig. 3. One end of the lever 17 has an offset end 19 which fits in the loop 16 of the spring member 12 and is provided with a detent 20 which tends to hold the loop in position. At the free end of the lever 17, I provide a plate 21 to be engaged by the finger of the user of the carpet sweeper when it is desired to dump the dust pans.

The spring member 12 and the lever 17 are so arranged that when the lever 17 is moved to the down position shown in Fig. 1, the member 12 raises the pans to closed position where their outer edges engage the stops 6. The spring is then flexed by further downward movement of the lever 17 which permits the lever to be moved under a catch 22 which is a small ear formed from the sheet metal of the pan top 4. The tension of the spring member 12 holds the pans tightly and resiliently in position so that they will not rattle and also holds the lever in resilient engagement with the catch 22 so that the lever will not be jarred from the catch.

When it is desired to dump the dust pans of the carpet sweeper, a slight pressure on the handle 17 and a slight movement of it to the position shown in dotted lines in Fig. 3 releases it and permits it to swing to the position shown in Fig. 2. This permits the dust pans to swing downwardly so that the litter collected in the use of the sweeper may be dumped from the sweeper.

In Figs. 5 and 6 I show a substantially similar arrangement. The pans 109 differ from those shown in Figs. 1 and 2 in that they are apertured at the points 110 to receive pivots 111. The catch 122 differs slightly from the catch 22 shown in Fig. 4 in that it is a separate member formed of sheet metal and held in place by a suitable nail 23 fastened in the case end 103.

In Figs. 8–12, I show a slightly modified form of connection between the spring and the dump lever. The spring 212 is substantially the same as spring 12 of Figs. 1–4. Instead of the loop 16, I provide a special fastening element 216 which is formed of sheet metal apertured at 24 to receive the end 219 of the dump lever 217. The aperture 24 is formed with slots 25 extending radially therefrom to receive the lugs 220 formed on the offset end 219 of the dump lever 217.

In Fig. 8, I show the lever 217 connected to the spring 212. In Fig. 9, I show in dotted lines the manner of insertion of the end 219 of the lever into the aperture 24 of the member 216, the lever being moved to a position to permit registration between the lugs 220 and the apertures 25. After the lever has been inserted in the opening, it is moved to the position shown in Fig. 8 and cannot become disconnected. The member 216 is fastened to the spring 212 by means of extensions 26 which wrap around the spring 212 which is bent slightly as at 27 to prevent slippage of the member 216 along the wire. This construction may be used in place of the construction shown in Figs. 1–4 and offers a very positive lock preventing disengagement between the lever and the spring.

Having thus described my invention, what I claim as new and desire to secure by Letters Patent is:

1. In a carpet sweeper having a case, the combination of a pair of spaced dust pans each extending along one side of the bottom of the case to close the same, stops on the case against which the pans rest in closed position, pivots on said case pivoting said pans adjacent the ends of their inner edges to permit the pans to swing downwardly from the bottom of the case, a spring having its ends pivoted to the ends of said pans at points spaced from the aforesaid pivots outwardly toward the edges of the case, said spring having a pair of substantially vertically extending arms connected by a substantially horizontal portion, a dump lever pivoted between its ends to the case, means connecting one end of said dump lever to the horizontal portion of said spring, and a catch on said case adapted to engage the other or free end of said lever and hold it in down position comprising a hook on said casing adapted to hook over said lever, said lever being so disposed that when it is in down position the pans are closed against said stops and said spring is tensioned to resiliently hold said pans in closed position, and said spring being so disposed that on release of said lever said spring exerts substantially no pan closing tension, whereby the release of said lever from said catch permits the free end thereof to raise and said pans to swing downwardly free from pan closing spring tension to dump the sweeper.

2. In a carpet sweeper having a case, the combination of a pair of spaced dust pans each extending along one side of the bottom of the case to close the same, stops on the case against which the pans rest in closed position, pivots on said case pivoting said pans adjacent the ends of their inner edges to permit the pans to swing downwardly from the bottom of the case, a pan closing member having substantially vertically extending arms pivoted to the ends of said pans at points spaced from the aforesaid pivots outwardly toward the edges of the case, said member having a substantially horizontal spring portion, a dump lever pivoted between its ends to the case, means connecting one end of said dump lever to said horizontal spring portion, and a catch on said case adapted to engage the other or free end of said lever and hold it in down position comprising a hook on said casing adapted to hook over said lever, said lever being so disposed that when it is in down position the pans are closed against said stops and said spring portion of said pan closing member is tensioned to resiliently hold said pans in closed position, and said spring portion being so disposed that on release of said lever said spring exerts substantially no pan closing tension, whereby the release of said lever from said catch permits the free end thereof to raise and said pans to swing downwardly free from pan closing spring tension to dump the sweeper.

3. In a carpet sweeper having a case, the combination of a pair of spaced dust pans each extending along one side of the bottom of the case to close the same, stops on the case against which the pans rest in closed position, pivots on the case pivoting the pans adjacent the ends of their inner edges to permit the pans to swing downwardly from the bottom of the case, a pan closing member having substantially vertically extending arms pivoted to the ends of said pans at points spaced from the adjacent pivots outwardly toward the edge of the case, said member having a substantially horizontal spring portion, and means on said case for raising said member and for exerting tension against the spring portion thereof to hold said pans resiliently in closed position, and a catch for holding said means in pan closing position, said spring portion being so arranged that on release of said means from said catch said means exert substantially no pan closing tension.

4. In a carpet sweeper having a case, the combination of a pair of spaced dust pans each extending along one side of the bottom of the case to close the same, stops on the case against which the pans rest in closed position, pivots on the case pivoting the pans adjacent the ends of their inner edges to permit the pans to swing downwardly from the bottom of the case, a spring having its ends pivoted to the ends of said pans at points spaced from the adjacent pivots outwardly toward the edge of the case, said spring bowing upwardly from the said pans, means on said case for raising the central portion of said spring to hold said pans in closed position and to tension said spring, and means for retaining said means in pan closing position, said spring being so disposed that on release of said first means it exerts substantially no pan closing tension.

5. In a carpet sweeper having pivoted dust pans, the combination of a spring for holding said pans in closed position, and releasable means for exerting a tension on said spring whereby the pans are held resiliently in closed position, said spring being disposed to exert substantially no pan closing tension when said means are not exerting tension on said spring, whereby on release of said means said pans are free to open.

6. In a carpet sweeper, the combination of dust pans and a pan closing member having a spring portion, means for moving said member to pan closing position and for exerting a tension on said spring portion to hold said pans resiliently in closed position, and a catch to hold said means in pan closing position, said spring portion being so disposed that it exerts substantially no pan closing tension when said means are not exerting tension on said spring portion, whereby on release of said means from said catch said pans may move to dumping position.

7. In a carpet sweeper, the combination of dust pans, a spring connected to said dust pans, releasable means for exerting tension on said spring and for holding said pans in closed position, said spring being so disposed that when said means are not exerting a tension thereon said spring exerts substantially no pan closing tension.

FRED W. PULLEN.